(12) United States Patent
Emoto

(10) Patent No.: US 6,458,395 B1
(45) Date of Patent: Oct. 1, 2002

(54) GELATINOUS FOOD PRODUCT AND PROCESS FOR PREPARING THE SAME

(75) Inventor: Mitsuo Emoto, Otsu (JP)

(73) Assignee: Otsuka Foods Co., Ltd., Osaka (JP)

( * ) Notice: Subject to any disclaimer, the term of this patent is extended or adjusted under 35 U.S.C. 154(b) by 0 days.

(21) Appl. No.: 09/582,923

(22) PCT Filed: Dec. 28, 1998

(86) PCT No.: PCT/JP98/06004

§ 371 (c)(1),
(2), (4) Date: Jul. 7, 2000

(87) PCT Pub. No.: WO99/34690

PCT Pub. Date: Jul. 15, 1999

(30) Foreign Application Priority Data

Jan. 8, 1998 (JP) .................................... 10-1958

(51) Int. Cl.[7] .......................... A23L 1/29; A23L 1/302; A23L 1/304; A23L 1/0524
(52) U.S. Cl. .......................... 426/72; 426/74; 426/573; 426/575; 426/577; 426/590; 426/648; 426/801
(58) Field of Search ................... 426/573, 801, 426/575, 577, 590, 648, 72, 74

(56) References Cited

U.S. PATENT DOCUMENTS 5,700,513 A * 12/1997 Mulchandani et al. ...... 426/573
5,866,190 A * 2/1999 Barey .......................... 426/573
5,932,235 A * 8/1999 Ninomiya et al. ........... 424/401
5,985,339 A * 11/1999 Kamarei ...................... 426/72
6,033,713 A * 3/2000 Sheldon ....................... 426/590

FOREIGN PATENT DOCUMENTS

| EP | 0 914 779 | 5/1999 |
| JP | 9-121786 | 5/1997 |
| WO | WO99 56563 | 11/1999 |

* cited by examiner

Primary Examiner—Helen Pratt
(74) Attorney, Agent, or Firm—Sughrue Mion, PLLC

(57) ABSTRACT

The present invention provide a gelatinous food product for supplying balanced nutrition, which is a gel of an emulsified mixture comprising 10 to 50 wt. % of total solid content on a dry weight basis and 50 to 90 wt. % of water, the solid content contains 30 to 90 wt. % of saccharide, 5 to 40 wt. % of lipid, 2 to 60 wt. % of protein, 0.2 to 5 wt. % of organic acid, 0.2 to 5 wt. % of organic acid salt, 0.2 to 5 wt. % of emulsifying agent and 0.2 to 5 wt. % of gelling agent, the food product having a pH of 3.3 to 4 and being a composite of an isoelectric gel of the protein and a heat-soluble gel formed with the gelling agent. The invention also provides a process for preparing the food product. The gelatinous food product of the invention is particularly suitable for nutrition of patients with dysphagia, since it comprises various nutrients in suitable proportions and has good eating qualities, for instance, ease of swallowing even by patients with dysphagia, owing to the soft jelly form.

11 Claims, No Drawings

GELATINOUS FOOD PRODUCT AND PROCESS FOR PREPARING THE SAME

FIELD OF THE INVENTION

The present invention relates to gelatinous food products for supplying balanced nutrition, particularly the gelatinous food products which contain all the essential nutrients, and which have a refreshing taste because of their pH of 3.3 to 4, and which is a composite of a gel formed with a gelling agent and an isoelectric gel of the protein, the composite producing good eating qualities, for instance, ease of swallowing owing to the soft gel form.

BACKGROUND ART

Conventionally, jellies made by setting beverages with agars or gelatins and gelatinous foods such as puddings, yogurts and aspics are known as foods for supplying water and nutrients to patients suffering from dysphagia (swallowing difficulty), typically elderly patients and patients with cerebrovascular diseases. If a substantially nonviscous liquid such as water or tea is carelessly given to patients with dysphagia, the liquid cannot be swallowed properly and may enter the trachea, increasing the risk of pneumonia, or threatening the life in extreme cases. The jellies or gelatinous foods are provided to the patients in order to avoid such risks.

Foods for patients with dysphagia are required to have the following properties. First, they should contain all the essential nutrients in suitable proportions for giving the patients sufficient nutrition. Further, they should have appropriate firmness and consistency that enable easy swallowing or easy chewing; should be cohesive in the mouth without separation; and should pass through the throat smoothly when swallowed.

However, the above-mentioned jellies and jellylike products such as puddings are usually produced or supplied as non-nutritional foods for healthy people, and thus cannot provide sufficient and well balanced nutrition to patients with dysphagia. In addition, these products still require chewing, and cannot be swallowed without chewing. That is, such products are insufficient in qualities necessary for taking in merely by swallowing.

In recent years, new food products, jellylike beverages of several kinds, have been on the soft drink market. These beverages are provided in the form of jellies, which are to be crushed by, for example, shaking, before drinking. Their unique drinking qualities, i.e., interesting swallowing characteristics and textural properties, suit the tastes of people today and attract their attention.

However, the jellylike beverages are also produced for healthy people, and do not have ingredients suitable for nutrition of patients with dysphagia. Although these beverages have an acidic pH close to that of ordinary soft drinks and thus have good storage stability, they do not contain substantial quantities of proteins or lipids. That is, these beverages do not comprise ingredients suitable for nutrition of patients with dysphagia, i.e., all the essential nutrients in suitable proportions. They are not even intended to have such makeup.

Further, protein-rich foods, such as puddings, are usually required to be sterilized by heating at 100° C. or higher (generally at 120° C. for 10 minutes), since they are adjusted to a neutral pH. The sterilization treatment causes the loss of nutrients (in particular, vitamins) or deterioration of the taste and flavor. If these foods are adjusted to an acidic pH to impart a refreshing taste, they have nonuniform texture due to coagulation of protein and thus are in no way refreshing. Further, such products, if having an acidic pH, are decomposed in a short period when exposed to the air.

As discussed above, nutritionally balanced food products remain to be developed which are suitable as foods for patients with dysphagia and which can be swallowed without chewing.

DISCLOSURE OF THE INVENTION

The object of the invention is to provide a novel gelatinous food product particularly suitable for nutrition of patients with dysphagia, the product comprising all the essential nutrients in suitable proportions and having the form of a soft jelly that can be readily eaten by patients with dysphagia.

The present inventors carried out extensive research to achieve the above object and found the following. As to food products to be swallowed without chewing, people, including patients with dysphagia, consider those having an acidic pH to be palatable. On the other hand, protein, one of the essential nutrients, greatly changes in its properties at the isoelectic point, and therefore does not form a homogeneous gel at an acidic pH that makes the food products palatable.

They carried out further research and found that, when specific amounts of lipid, saccharide, organic acid, organic acid salt, emulsifying agent and gelling agent are added to a protein so as to obtain an emulsion having an acidic pH equal or close to the isoelectric point of the protein, a composite of an isoelectric gel of the protein and a gel formed with the gelling agent is obtained, which is soft and homogeneous and capable of being swallowed without chewing. The present invention has been accomplished base on this novel finding.

The present invention provides a gelatinous food product for supplying balanced nutrition, which is a gel of an emulsified mixture comprising 10 to 50 wt. % of the combined amount of the ingredients listed below (on a dry weight basis) and 50 to 90 wt. % of water, and which has a pH of 3.3 to 4, and which is a composite of an isoelectric gel of the protein and a heat-soluble gel formed with the gelling agent.

| | |
|---|---|
| Saccharide | 30–90 wt. % |
| Lipid | 5–40 wt. % |
| Protein | 2–60 wt. % |
| Organic acid | 0.2–5 wt. % |
| Organic acid salt | 0.2–5 wt. % |
| Emulsifying agent | 0.2–5 wt. % |
| Gelling agent | 0.2–5 wt. % |

The gelatinous food product of the invention has the form of a soft gel particularly suitable as a food for patients with dysphagia. The food product can be easily sheared or crushed, and the sheared or crushed product releases a suitable amount (about 2 to 20%) of water. Accordingly, the food product has excellent eating qualities and textural properties so that it can be readily crushed in the mouth by, for example, pressing with the tongue, without chewing, and smoothly passes through the throat. In particular, the food product of the invention is characterized in that it comprises protein, lipid and other nutrients that are not present in conventional soft drinks, and still retains the excellent eating qualities and textural properties.

Further, the gelatinous food product of the invention, which comprises suitable and sufficient proportions of protein, lipid and other nutrients essential to the human body as shown above, can effectively supply nutrition when ingested.

Furthermore, the gelatinous food product of the invention has a refreshing taste and good storage stability because of its pH of 3.3 to 4, preferably 3.5 to 4. Moreover, in spite of the acidic pH, the food product of the invention is free from grains of coagulated protein, and has smoothness and homogeneity that impart good eating qualities and textural properties to the food product.

The ingredients of the gelatinous food product of the invention are described below in detail.

Saccharide

The saccharide for use in the gelatinous food product of the invention is one of the essential nutrients, and can be selected from ones capable of being stored in the form of glycogen in the liver or muscle and serving as an energy source for physical activities. Examples of such saccharides include various ordinary saccharides such as monosaccharides (e.g., glucose and fructose) and disaccharides (e.g., maltose and sucrose); sugar alcohols such as xylitol, sorbitol, glycerine and erythritol; polysaccharides such as dextrin and cyclodextrin; and oligosaccharides such as fructo oligosaccharide, galacto oligosaccharide and lactosucrose. These saccharides can be used singly or in combination. When two or more saccharides are used in combination, commercially available saccharide mixtures, for example, isomerized sugar or purified sucrose are of course usable.

Usable saccharides include those serving not only as nutrients but also as sweeteners, such as sucrose. Saccharides serving as sweeteners can be preferably used to impart sweetness to the gelatinous food product.

Of course, it is possible to add a sweetener other than saccharides, in combination with or independently of the saccharide. Usable sweeteners include natural sweeteners such as sormatin, stevia extracts (e.g., rebaudioside A) and glycyrrhizin, and synthetic sweeteners such as saccharin and aspartame.

The proportion of the saccharide in the gelatinous food product of the invention is usually about 30 to 90% (wt. %, the same applies hereinafter), preferably about 40 to 80%, more preferably about 60 to 70% on a dry weight basis. Proportions less than 30% or more than 90% are not preferable, since the resulting food product does not satisfy requirements for nutritionally balanced foods. That is, when the proportion is less than 30%, the resulting food product is insufficient as a nutrient source, whereas if the proportion exceeds 90%, the resulting food product contains excess nutrition.

A particularly preferred proportion of the saccharide serving as a sweetener is 30 to 60%, more preferably 40 to 50%, on a dry weight basis.

Among the above-mentioned oligosaccharides, lactosucrose is preferable. Use of lactosucrose increases lactobacilli bifidus in the body and decreases decomposition products, to thereby contribute to cancer prevention and immune system enhancement.

Lipid

The lipid for use in the food product of the invention can be selected from ordinary lipids serving as substitute energy sources for saccharides during, for example, long-term physical exercise. Examples of lipids include long chain fatty acid triglycerides (LCTS) as essential fatty acids, such as soybean oil, cotton seed oil, safflower oil, corn oil, rice oil, coconut oil, perilla oil, sesame oil, linseed oil and like vegetable oils; sardine oil, cod liver oil and like fish oils; and toad oil. The lipid may be a medium chain fatty acid triglyceride (MCT) usually having 8 to 10 carbon atoms. MCTs are easy to absorb and burn, and difficult to store. The LCTs and MCTs may be used singly, or two or more members independently selected from LCTs or MCTs can be used in combination.

It is preferable that the lipid be present in the gelatinous food product of the invention in a proportion of about 5 to 40%, preferably about 10 to 30%, more preferably about 15 to 25%, on a dry weight basis. Proportions less than 5% or greatly exceeding 40% are not preferable, since the resulting food product does not satisfy requirements for nutritionally balanced food products.

Lipids are sparingly soluble in water, and thus are used in the form of an oil-in-water emulsion in the present invention. For producing the food product of the invention, it is therefore necessary to use an emulsifying agent in order to emulsify the lipid.

Emulsifying Agent

The emulsifying agent for use in the invention can be selected from ones conventionally used in the field of food products. Considering that the food product of the invention is adjusted to an acidic pH, the emulsifying agent preferably has acid resistance. A typical example of such emulsifying agents is pectin. Examples of preferred emulsifying agents other than pectin include egg yolk lecithin, hydrogenated egg yolk lecithin, soybean lecithin, hydrogenated soybean lecithin and like phosholipids; polyoxyethylene monooleate (commercially available as "Tween 80", product of AMR) and like synthetic surfactants; and sucrose fatty acid ester, polyglycerin fatty acid ester and the like.

These emulsifying agents may be used singly or in combination, but usually two or more of them are used in combination. The proportion of the emulsifying agent is preferably about 0.1 to 10%, more preferably about 0.1 to 3%, relative to the amount of the the emulsion to be prepared. The proportion of the emulsifying agent, if calculated as the proportion in the food product of the invention, is about 0.2 to 5%, preferably about 0.5 to 3%, on a dry weight basis.

Protein

The protein, one of the essential ingredients of the gelatinous food product of the invention, is selected from ones conventionally used in the field of food products. It is necessary that the protein form an isoelectric gel at the pH of the food product of the invention, i.e., pH 3.3 to 4. Examples of such proteins include gelatin, casein, whey proteins (e.g., lactalbumin), soybean protein and wheat protein; salts of these proteins; decomposition products (acid decomposition products and enzyme decomposition products) of these proteins; extracts of these proteins; concentrates of these proteins; and whole milk powders and skimmed milk powders. The proteins may be used singly or in combination.

The protein is present in the food product of the invention in a proportion of about 2 to 60%, preferably about 10 to 45%, more preferably about 15 to 30% on a dry weight basis. Proportions less than 2% or more than 30% are not preferable, since the resulting food product does not satisfy the requirements for nutritionally balanced food products.

Organic Acid and Organic Acid Salt

Other essential ingredients of the gelatinous food product of the invention, the organic acid and organic acid salt, can be selected from those conventionally used in foods or drinks and capable of adjusting the food product of the invention (gel) to pH 3.3 to 4, more preferably 3.5 to 4. Preferred organic acids include citric acid, tartaric acid, malic acid, succinic acid, ascorbic acid and gluconic acid. These organic acids may be used singly or in combination. It is usually desirable that the organic acid be present in the gelatinous food product of the invention in a proportion of about 0.2 to 5%, preferably about 0.5 to 3%, on a dry weight basis. Proportions less than 0.2% make it difficult to adjust the food product to pH 3.3 to 4. On the other hand, proportions greatly exceeding 5% impart to the food product too much sourness, which may impair the taste.

Organic acid salts have pH adjusting and buffering action. Examples of organic acid salts include sodium salt, potassium salt and like alkali metal salts of the above organic acids; and calcium salt, magnesium salt and like alkaline earth metal salts of the above organic acids. These organic acid salts may be used either singly or in combination. The organic acid salt is present in the food product of the invention in a proportion of about 0.2 to 5%, preferably about 0.5 to 3%, on a dry weight basis. Proportions less than 0.2% result in insufficient buffering action. Usually, proportions up to 5% can achieve sufficient results.

Gelling Agent

The gelling agent is preferably selected from ones conventionally used as thickening agents in the field of food products. Examples include pectin, furcelleran, carrageenan, agar, locust been gum, guar gum and arabic gum. They can be used singly or in combination. These gelling agents have suitable gelling ability and gel-stabilizing ability, and thus can impart to the resulting gel desired gel strength and water-releasability, in particular, gel strength and water-releasability such that the gel can be crushed easily in the mouth with the tongue.

According to the present invention, xanthan gum, konjak mannan or the like may be used as a part of the gelling agent, when so required. It is desirable that the gelling agent be present in the food product of the invention in a proportion of about 0.2 to 5%, preferably about 0.3 to 2%, on a dry weight basis. If the proportion is less than 0.2%, the obtained food product has insufficient gel strength. On the other hand, if the proportion greatly exceeds 5%, the obtained gel is too firm, failing to provide the contemplated food product for patients with dysphagia.

Additive

The gelatinous food product of the invention may comprise, in addition to the specified proportions of the essential ingredients, suitable additives where necessary.

Usable additives include multivitamin preparations, minerals (electrolytes and trace elements), natural and synthetic flavors, colors, flavoring materials (cheeses, chocolates, etc.), stabilizers, preservatives, alcohols, fruit juices and fruit pulps. They may be used singly or in combination. The proportion of the additive is not limited, but is usually up to about 20 wt. parts relative to 100 wt. parts of the food product of the invention.

Among the above additives, multivitamin preparations and minerals are preferably used, since they can promote the purpose of balanced nutrition. Preferred multivitamin preparations include mixtures of various water- or lipid-soluble vitamins such as vitamin A (retinols), vitamin $B_1$ (thiamine), vitamin $B_2$ (riboflavin), vitamin B6 (pyridoxine), vitamin $B_{12}$ (cyanocobalamin), vitamin C (ascorbic acid), vitamin D (cholecalciferol or the like), vitamin E (tocopherol), niacin, bisbentiamine, nicotinic acid amide, calcium panthothenate, folic acid, biotin, and bitartaric acid choline.

Particularly preferred multivitamin preparations are those comprising the following vitamins in the following amounts relative to 200 g of the food product of the invention.

| | |
|---|---|
| Vitamin A | 10–2000 IU |
| Vitamin $B_1$ | 0.01–3.0 mg |
| Vitamin $B_2$ | 0.01–3.1 mg |
| Vitamin $B_6$ | 0.01–3.2 mg |
| Vitamin $B_{12}$ | 0.1–30 ng |
| Vitamin C | 1–500 mg |
| Vitamin D | 1–300 IU |
| Vitamin E | 1–100 IU |
| Nicotinic acid amide | 0.1–30 mg |
| Calcium pantotheate | 0.1–31 mg |
| Folic acid | 0.01–3.0 mg |

Usable minerals (electrolytes and trace elements) include those known, such as sodium chloride, sodium acetate, magnesium sulfate, magnesium chloride, calcium chloride, dipotassium phosphate, monosodium phosphate, calcium glycerophosphate, iron and sodium succinate citrate, manganese sulfate, copper sulfate, zinc sulfate, sodium iodate, potassium sorbate, zinc, manganese, copper, iodine and cobalt. The amounts of these minerals can be liberally selected according to the purpose.

Process for Preparing Gelatinous Food Product for Supplying Balanced Nutrition

The process for preparing the gelatinous food product of the invention will be described below in detail. The food product is prepared by mixing and emulsifying the essential ingredients, one or more optional additives and water, and heating the emulsion. The emulsion may be obtained by mixing all the ingredients at the same time, or preferably by preparing an aqueous solution of water-soluble ingredients, which is then mixed with oil-soluble ingredients and emulsifying agent, followed by emulsification. A more preferable process comprises the steps of mixing the protein with a mixture of water and a suitable emulsifying agent for preliminary emulsification, adding to the resulting emulsion an aqueous solution of the lipid, emulsifying agent, saccharide, organic acid and optional additives, emulsifying the mixture, adding the organic acid salt to adjust the emulsion to a prescribed pH (isoelectric point of the protein) and adding the gelling agent, followed by further emulsification. The mixing and emulsification of the ingredients may be carried out at room temperature, or preferably at a slightly elevated temperature.

The emulsification can be performed in conventional manners using suitable emulsifiers, such as homomixers and high-pressure homogenizers, by the complete passage process or circulation process.

The emulsion thus obtained is then heated, filled into a suitable container in conventional manners and sterilized, giving the contemplated gelatinous food product. The sterilization can be performed in conventional manners by heating or aseptic filtration. When heat sterilization is employed, the food product need not be heated previous to sterilization, since the product is heated during sterilization. However, when the food product is sterilized without heating, it is necessary to heat the product before sterilization. Heating before sterilization can be carried out under conditions similar to those conventionally employed in heat sterilization.

The obtained gelatinous food product of the invention has good eating qualities, and can be safely swallowed by patients with dysphagia associated with various diseases or following surgical operations. The food product of the invention can provide well balanced nutrition when ingested, and is suitable for giving nutrition to, not only patients with dysphagia, but also athletes who wish to quickly obtain nutrients during training or competition.

BEST MODE FOR CARRYING OUT THE INVENTION

To further illustrate the invention, there are presented the following examples in which all parts and percentages are by weight unless otherwise specified.

EXAMPLE 1

| | |
|---|---|
| Sucrose | 5 parts (13.2) |
| Dextrin | 15 parts (39.4) |
| Casein | 5 parts (13.2) |
| Lactalubmin | 5 parts (13.2) |
| Rice oil (refined rice oil) | 6.3 parts (16.6) |
| Enzyme-decomposed lecithin | 0.2 parts (0.5) |
| Water | 62 parts |
| Citric acid | 0.8 parts (2.1) |
| Sodium citrate | 0.2 parts (0.5) |
| Pectin | 0.3 parts (0.8) |
| Xanthan gum | 0.2 parts (0.5) |
| Total | 100.0 parts |

According to the above formula (wherein the values in the parentheses are percentages of the ingredients other than water on a dry weight basis), citric acid as organic acid, sucrose and dextrin as saccharide, and casein and lactalbumin as protein were added to water preheated to 70° C. The mixture was stirred in a homogenizer (product of Tokushu Kika Kogyo) at 9000 rpm for 5 minutes. To the resulting liquid were added refined rice oil as lipid and enzyme-decomposed lecithin as emulsifying agent. The mixture was emulsified (10000 rpm, 20 minutes) and adjusted to pH 3.9 by addition of sodium citrate as organic acid salt (pH adjusting and buffering agent).

To the resulting emulsion were added pectin and xanthan gum as gelling agent, followed by homogenization (10000 rpm, 10 minutes).

The obtained emulsion was filled into a soft bag having a nozzle, heated at 65° C. for 10 minutes and allowed to cool, giving a gelatinous food product of the present invention.

The obtained gelatinous food product had a uniform and smooth surface appearance, and was in the form of a soft gel that could be easily crushed in the mouth with the tongue, thus requiring no chewing.

EXAMPLE 2

| | |
|---|---|
| Sucrose | 5 parts (14) |
| Dextrin | 15 parts (41.9) |
| Enzyme-decomposed soybean protein | 5 parts (14) |
| Soybean isolate | 5 parts (14) |
| MCT | 4 parts (11.2) |
| Egg yolk lecithin | 0.2 parts (0.6) |
| Water | 64.2 parts |
| Citric acid | 0.8 parts (2.2) |
| Sodium ascorbate | 0.3 parts (0.8) |
| Carrageenan | 0.3 parts (0.8) |
| Agar | 0.2 parts (0.6) |
| Total | 100 parts |
| Multivitamin preparation | 0.2 parts |
| Magnesium sulfate | 0.1 parts |
| Potassium chloride | 0.1 parts |
| Disodium hydrogenphosphate | 0.1 parts |
| Yeast zinc | 0.1 parts |
| Total | 0.6 parts |

In the above formula, "egg yolk lecithin" is a product of Taiyo Kagaku; "multivitamin preparation" has the makeup shown in the above description of additives; and the values in the parentheses are percentages of the ingredients relative to the combined amount of the essential ingredients of the invention on a dry weight basis.

According to the formula, citric acid as organic acid, sucrose and dextrin as saccharide, and enzyme-decomposed soybean protein and soybean isolate as protein were added to water preheated to 70° C. The mixture was stirred in a homogenizer (product of Tokushu Kika Kogyo) at 9000 rpm for 5 minutes. To the resulting liquid were added MCT as lipid and egg yolk lecithin as emulsifying agent, followed by emulsification (10000 rpm, 20 minutes). To the emulsion were added the multivitamin preparation, magnesium sulfate, potassium chloride, disodium hydrogenphosphate and yeast zinc, and the resulting mixture was adjusted to pH 3.9 by addition of sodium ascorbate as organic acid salt (pH adjusting and buffering agent).

To the resulting emulsion were added carrageenan and agar as gelling agent, followed by further homogenization (10000 rpm, 10 minutes). The obtained emulsion was filled into a soft bag having a nozzle and sterilized by heating at 65° C. for 10 minutes, giving a gelatinous food product of the present invention.

The obtained gelatinous food product had a uniform and smooth surface appearance, and was in the form of a soft gel that could be easily crushed in the mouth with the tongue, thus requiring no chewing.

EXAMPLE 3

| | |
|---|---|
| Sucrose | 5 parts (12.9) |
| Dextrin | 15 parts (38.8) |
| Casein | 5 parts (12.9) |
| Lactalubmin | 5 parts (12.9) |
| Rice oil (refined rice oil) | 7 parts (18.1) |
| Enzyme-decomposed lecithin | 0.2 parts (0.5) |
| Water | 61.3 parts |
| Ascorbic acid | 0.8 parts (2.1) |
| Sodium citrate | 0.2 parts (0.5) |
| Pectin | 0.3 parts (0.8) |
| Xanthan gum | 0.2 parts (0.5) |
| Total | 100.0 parts |

According to the above formula (wherein the values in the parentheses are percentages of the ingredients other than water on a dry weight basis), ascorbic acid as organic acid, sucrose and dextrin as saccharide, and casein and lactalbumin as protein were added to water preheated to 50° C. The mixture was stirred in a homomixer (product of Tokushu Kika Kogyo) at 9000 rpm for 5 minutes. To the resulting liquid were added refined rice oil as lipid and enzyme-decomposed lecithin as emulsifying agent, followed by emulsification (10000 rpm, 20 minutes). The emulsion was adjusted to pH 3.9 by addition of sodium citrate as organic acid salt (pH adjusting and buffering agent).

To the resulting emulsion were added pectin and xanthan gum as gelling agent, followed by further homogenization (10000 rpm, 10 minutes).

The obtained emulsion was filled into a soft bag having a nozzle, sterilized by heating at 90° C. for 10 minutes, giving a gelatinous food product of the present invention.

EXAMPLE 4

| | |
|---|---|
| Sucrose | 5 parts (14) |
| Dextrin | 15 parts (41.9) |
| Enzyme-decomposed soybean protein | 5 parts (14) |
| Soybean isolate | 5 parts (14) |
| MCT | 4 parts (11.2) |
| Egg yolk lecithin | 0.2 parts (0.6) |
| Water | 64.2 parts |
| Gluconic acid | 0.8 parts (2.2) |
| Sodium ascorbate | 0.3 parts (0.8) |
| Carrageenan | 0.3 parts (0.8) |
| Agar | 0.2 parts (0.6) |
| Total | 100 parts |
| Multivitamin preparation | 0.2 parts |
| Magnesium sulfate | 0.1 parts |
| Potassium chloride | 0.1 parts |
| Sodium secondary phosphate | 0.1 parts |
| Total | 0.5 parts |

In the above formula, "egg yolk lecithin" is a product of Taiyo Kagaku; "multivitamin preparation" has the makeup shown in the above description of additives; and the values in the parentheses are percentages of the ingredient relative to the combined amount of the essential ingredients of the invention on a dry weight basis.

According to the formula, gluconic acid as organic acid, sucrose and dextrin as saccharide, and enzyme-decomposed soybean protein (powder) and soybean isolate (powder) as protein were added to water. The mixture was stirred in a homomixer (product of Tokushu Kika Kogyo) at 9000 rpm for 5 minutes. To the resulting liquid were added the multivitamin preparation, magnesium sulfate, potassium chloride and sodium secondary phosphate. Further, MCT as lipid and egg yolk lecithin as emulsifying agent were added, followed by homogenization (10000 rpm, 20 minutes). The emulsion was adjusted to pH 3.8 by addition of sodium ascorbate as organic acid salt (pH adjusting and buffering agent).

To the resulting emulsion were added carrageenan and agar as gelling agent, followed by further homogenization (10000 rpm, 10 minutes). The obtained emulsion was filled into a soft bag having a nozzle and sterilized by heating at 90° C. for 10 minutes, giving a gelatinous food product of the present invention.

The obtained gelatinous food product had a uniform and smooth surface appearance, and was in the form of a soft gel that could be easily crushed in the mouth with the tongue, thus requiring no chewing.

EXAMPLE 5

| | |
|---|---|
| Glucose | 5 parts (10.6) |
| Lactosucrose | 15 parts (31.9) |
| Soybean protein | 5 parts (10.6) |
| Whey protein concentrate (powder) | 10 parts (21.3) |
| Palm oil | 10 parts (21.3) |
| Polyglycerin fatty acid ester | 0.4 parts (0.9) |
| Water | 53.0 parts |
| Malic acid | 0.7 parts (1.5) |
| Sodium malate | 0.2 parts (0.4) |
| Gelatin | 0.5 parts (1.1) |
| Guar gum | 0.2 parts (0.4) |
| Total | 100.0 parts |
| Multivitamin preparation | 0.2 parts |
| Polydextrose | 4 parts |
| Magnesium chloride | 0.1 parts |
| Potassium sulfate | 0.1 parts |
| Iron lactate | 0.1 parts |
| Sodium secondary phosphate | 0.1 parts |
| Total | 4.6 parts |

In the above formula, "polyglycerin fatty acid ester" is a product of Taiyo Kagaku; "multivitamin preparation" has the makeup shown in the above description of additives; and the values in the parentheses are percentages of the ingredients relative to the combined amount of the essential ingredients on a dry weight basis.

According to the above formula, malic acid as organic acid, glucose and lactosucrose as saccharide, and soybean protein (powder) and whey protein concentrate (powder) as protein were added to water. The mixture was stirred in a homomixer (product of Tokushu Kika Kogyo) at 9000 rpm for 5 minutes. To the resulting liquid were added palm oil as lipid and polyglycerin fatty acid ester as emulsifying agent. Further, the multivitamin preparation, polydextrose, magnesium chloride, potassium sulfate, iron lactate and sodium secondary phosphate were added, followed by emulsification (10000 rpm, 20 minutes). The emulsion was adjusted to pH 3.7 by addition of sodium malate as organic acid salt (pH adjusting and buffering agent).

To the resulting emulsion were added gelatin and guar gum as gelling agent, followed by further homogenization (10000 rpm, 10 minutes). The obtained emulsion was filled into a soft bag having a nozzle, and sterilized by heating at 90° C. for 10 minutes, giving a gelatinous food product of the present invention.

The obtained gelatinous food product had a uniform and smooth surface appearance, and was in the form of a soft gel that could be easily crushed in the mouth with the tongue, thus requiring no chewing.

Test Example 1 (Test of Properties of Gelatinous Food Product of the Invention)

The procedure of Example 1 was repeated with the exception of varying the amount of citric acid (and varying the amount of water in accordance with the amount of citric acid) to obtain gelatinous food product samples of the present invention and comparative gelatinous food product samples, all having a pH in a specific range (pH 3.0 to 4.4).

Each of the obtained samples (10 cm cubes) was cut into 5 mm cubes and allowed to stand for 1 minute. Then, the amount of water released from the sample was measured, and the percentage of released water relative to the amount of the sample (percentage of released water) was calculated.

The sourness and firmness (texture) of the samples were evaluated by 10 panelists. The sourness was evaluated on a three-rank scale: strong, favorable, and insufficient; and the firmness on a three-rank scale: firm, grainy, and favorable.

The results are shown in Table 1. The sensory evaluation ratings in the table are those given by half or more of the panelists.

TABLE 1

| Sample No. | pH of sample | Percentage of released water | Sensor evaluation Sourness | Firmness |
|---|---|---|---|---|
| Comp. sample 1 | 3.0 | 30 | Strong | Firm |
| Present invention 1 | 3.5 | 20 | Favorable | Favorable |
| Present invention 2 | 3.7 | 5 | Favorable | Favorable |
| Present invention 3 | 4.0 | 5 | Favorable | Favorable |
| Comp. sample 2 | 4.2 | 30 | Insufficient | Firm |
| Comp. sample 3 | 4.4 | 50 | Insufficient | Firm |

The results shown in Table 1 reveal that the gelatinous food products of the invention having a pH of 3.5 to 4.0 release suitable amounts of water, and have favorable sourness and favorable firmness.

INDUSTRIAL APPLICABILITY

The gelatinous food product of the invention has good eating qualities and can be safely eaten by patients with dysphagia associated with various diseases or following surgical operations, the food product being capable of supplying well balanced nutrition. Further, the food product of the invention is suitable for not only the above patients but also healthy people, for example, athletes who need to obtain nutrition quickly during training or competition.

What is claimed is:

1. A gelatinous food product for supplying balanced nutrition, which is a gel of an emulsified mixture comprising 10 to 50 wt. % of the combined amount of the ingredients listed below, on a dry weight basis, and 50 to 90 wt. % of water, the gel having a pH of 3.3 to 4, and being a composite of an isoelectric gel of the protein and a heat-soluble gel formed with a gelling agent

| Saccharide | 30–90 wt. % |
|---|---|
| Lipid | 5–40 wt. % |
| Protein | 2–60 wt. % |
| Organic acid | 0.2–5 wt. % |
| Organic acid salt | 0.2–5 wt. % |
| Emulsifying agent | 0.2–5 wt. % |
| Gelling agent | 0.2–5 wt. %. |

2. A gelatinous food product according to claim 1, which is a gel obtained by heating an emulsified mixture comprising 10 to 50 wt. % of the combined amount of the ingredients listed below, on a dry weight basis, and 50 to 90 wt. % of water, the gel having a pH of 3.3 to 4.

| Saccharide | 40–80 wt. % |
|---|---|
| Lipid | 10–30 wt. % |
| Protein | 10–45 wt. % |
| Organic acid | 0.5–3 wt. % |
| Organic acid salt | 0.5–3 wt. % |
| Emulsifying agent | 0.5–3 wt. % |
| Gelling agent | 0.5–3 wt. % |

3. A gelatinous food product according to claim 1 wherein the emulsifying agent is at least one member selected from the group consisting of pectin and polyglycerin fatty acid ester.

4. A gelatinous food product according to claim 1 wherein the gelling agent is at least one member selected from the group consisting of pectin, furcelleran, carrageenan, agar, locust bean gum, guar gum and arabic gum.

5. A gelatinous food product according to claim 1 further containing at least one multivitamin preparation or at least one mineral, or both.

6. A gelatinous food product according to claim 1 which is suitable for nutrition of patients with dysphagia.

7. A process for supplying nutrition to patients with dysphagia by ingestion of a gelatinous food product according to claim 1.

8. A process for preparing a gelatinous food product for supplying balanced nutrition, the process comprising the steps of:

(a) mixing and emulsifying 10 to 50 wt. % of the combined amount of the ingredients listed below, on a dry weight basis, and 50 to 90 wt. % of water; and (b) heating the resulting emulsion to both dissolve the gelling agent and to form an isoelectric gel of the protein.

| Saccharide | 30–90 wt. % |
|---|---|
| Lipid | 5–40 wt. % |
| Protein | 2–60 wt. % |
| Organic acid | 0.2–5 wt. % |
| Organic acid salt | 0.2–5 wt. % |
| Emulsifying agent | 0.2–5 wt. % |
| Gelling agent | 0.2–5 wt. %. |

9. process according to claim 8 wherein the emulsifying agent is at least one member selected from the group consisting of pectin and polyglycerin fatty acid ester.

10. A process according to claim 8 wherein the gelling agent is at least one member selected from the group consisting of pectin, furcelleran, carrageenan, agar, locust bean gum, guar gum and arabic gum.

11. A gelatinous food product obtained by the process according to claim 8 wherein the mixture to be emulsified further contains at least one multivitamin preparation or at least one mineral, or both.

* * * * *